Figure 1:
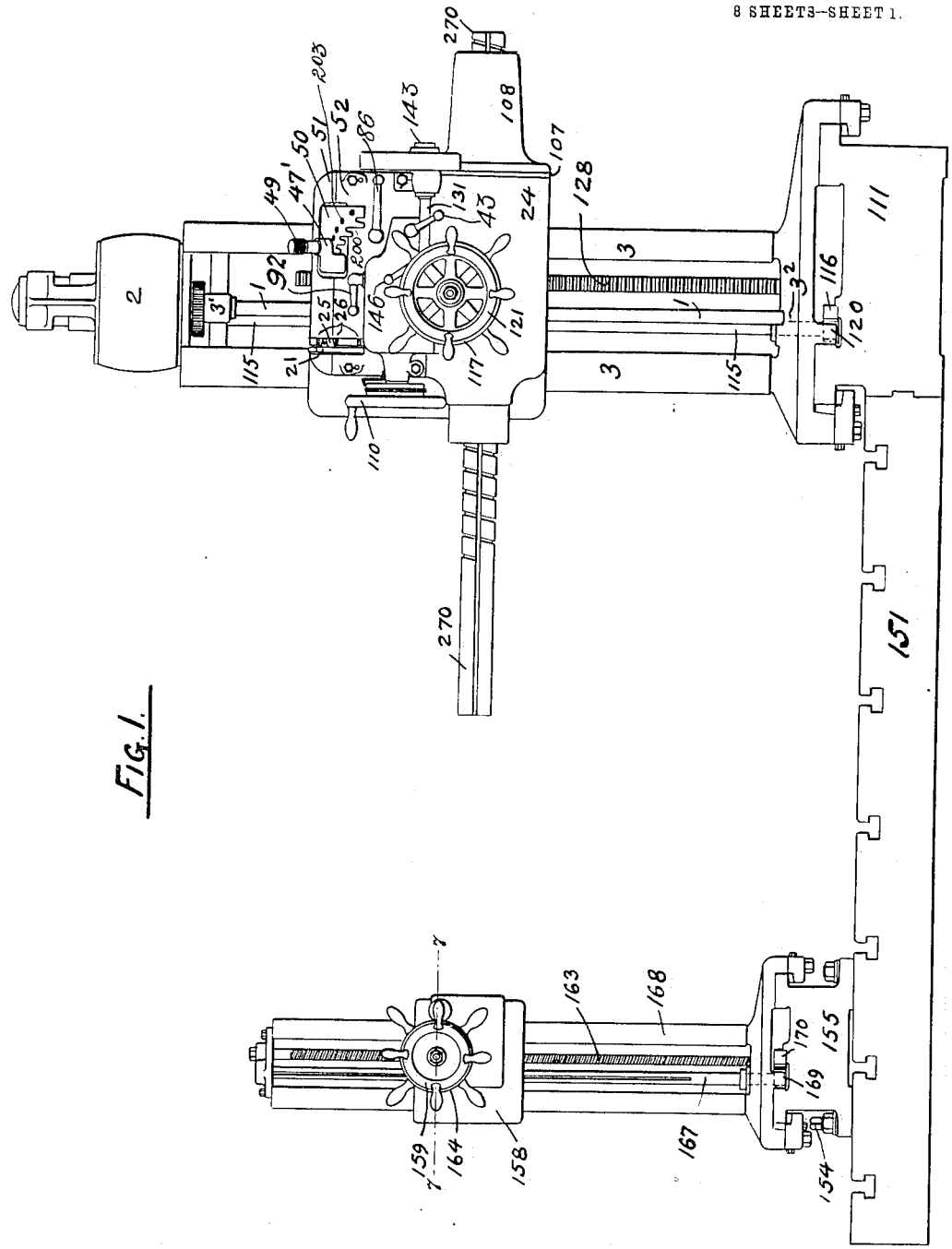

C. M. CONRADSON.
MULTIPLE USE MACHINE.
APPLICATION FILED NOV. 18, 1908. RENEWED JAN. 10, 1912.

1,121,714.

Patented Dec. 22, 1914.
8 SHEETS—SHEET 5.

WITNESSES.
Lois D. Moore
Simon D. Olsen

INVENTOR.
Conrad M. Conradson,
Per H. D. Kennedy
Attorney.

C. M. CONRADSON.
MULTIPLE USE MACHINE.
APPLICATION FILED NOV. 18, 1908. RENEWED JAN. 10, 1912.
1,121,714.
Patented Dec. 22, 1914.
8 SHEETS—SHEET 6.
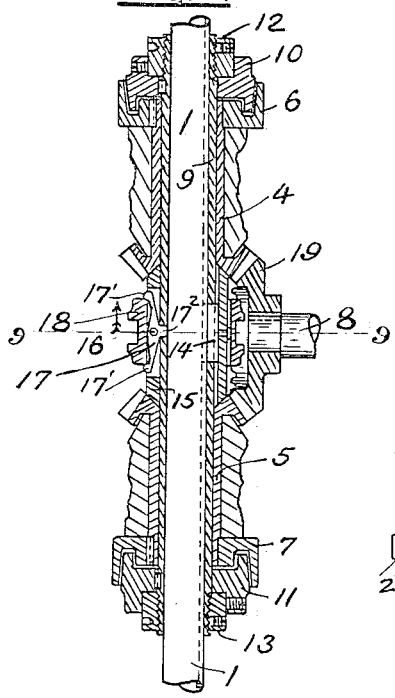
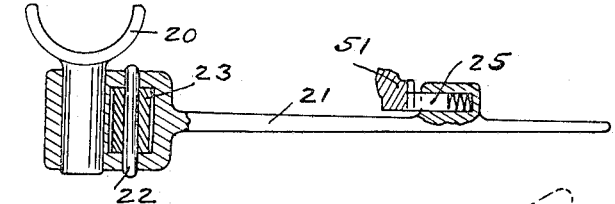
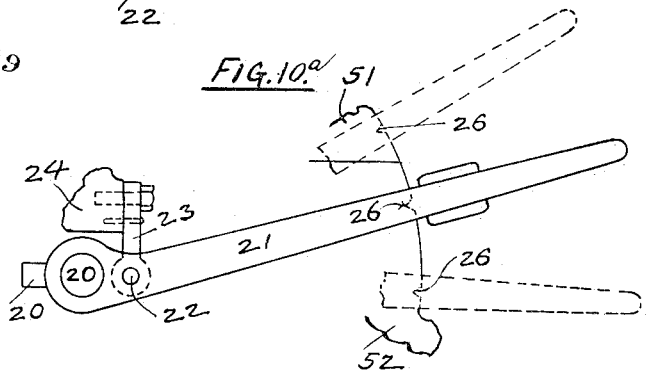
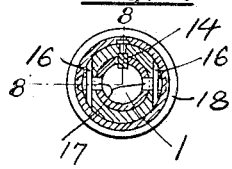
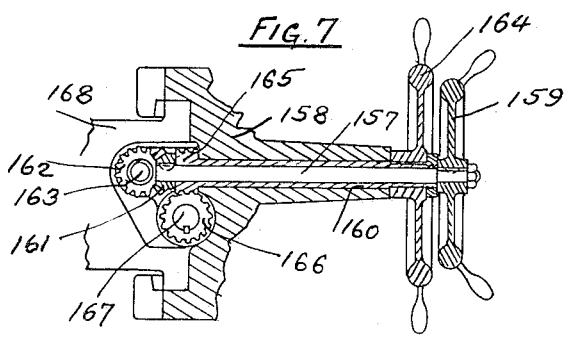
WITNESSES.
Lois D. Moore
Simon D. Olsen
INVENTOR.
Conrad M. Conradson
Per H. R. Kennedy
Attorney C. M. CONRADSON.
MULTIPLE USE MACHINE.
APPLICATION FILED NOV. 18, 1908. RENEWED JAN. 10, 1912.
1,121,714.
Patented Dec. 22, 1914.
8 SHEETS—SHEET 7.
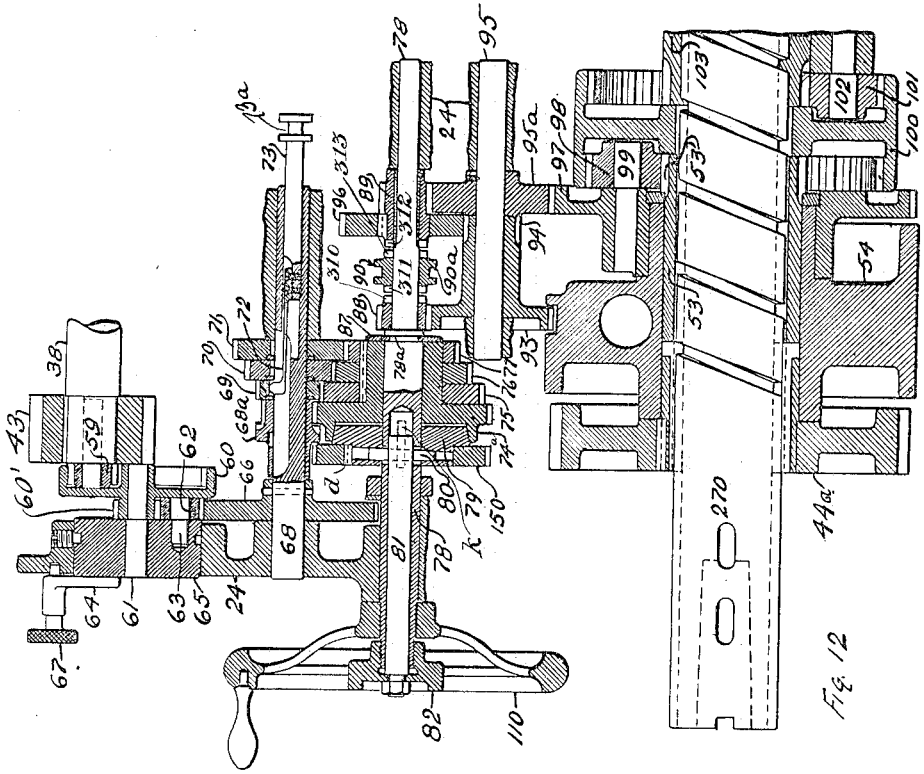
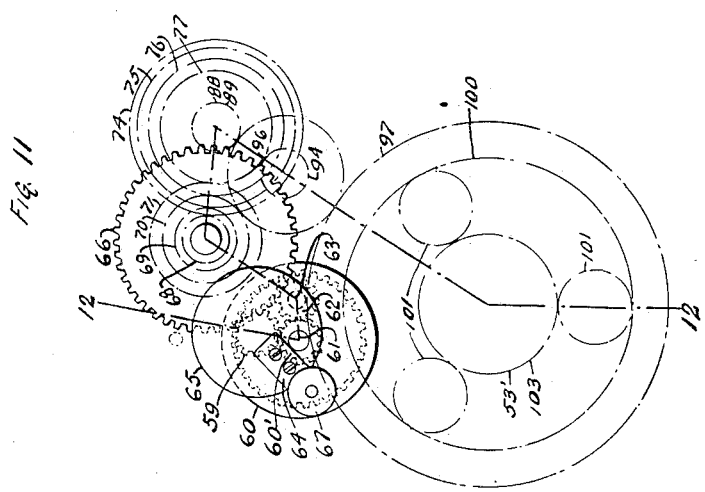

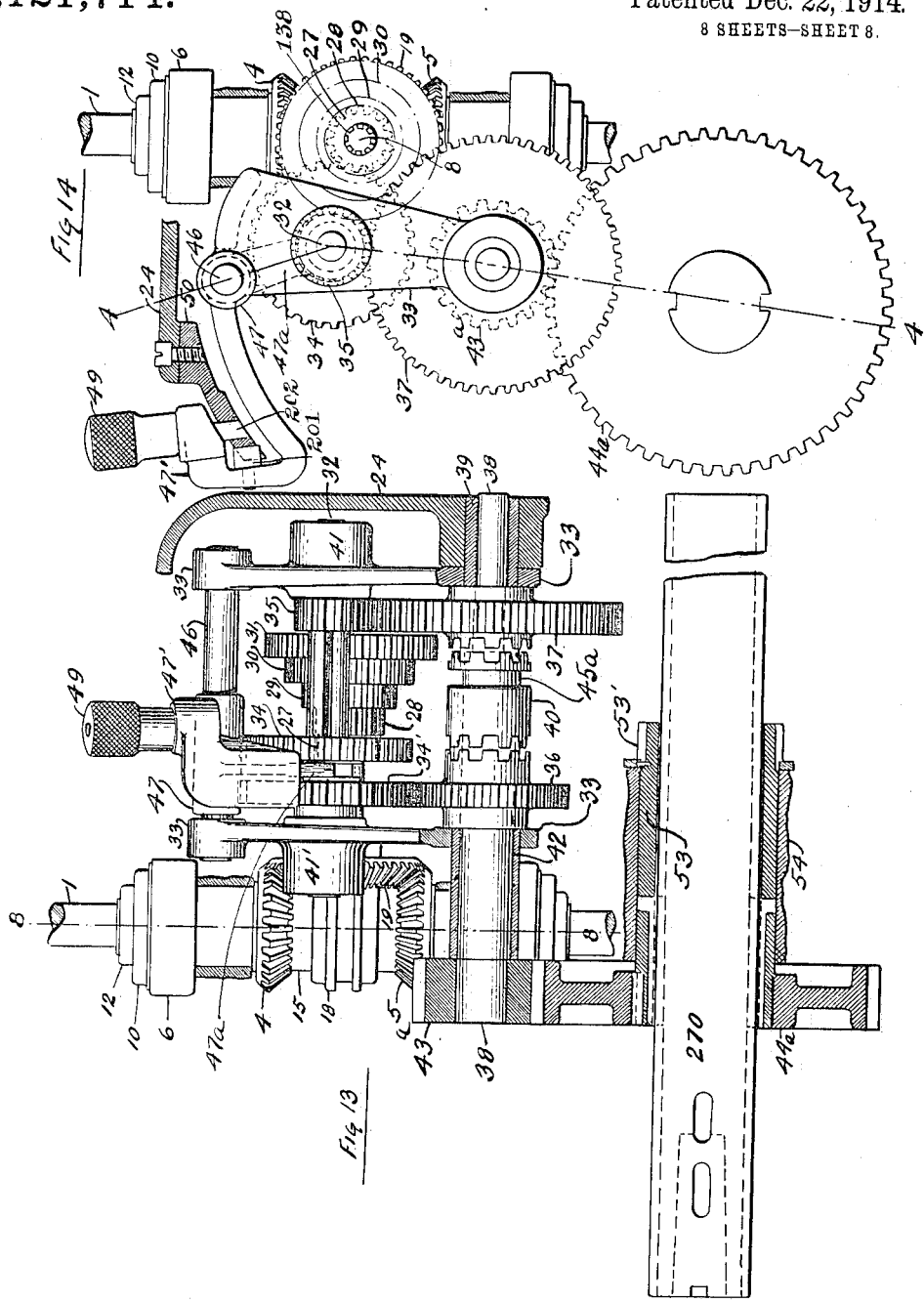

UNITED STATES PATENT OFFICE.

CONRAD M. CONRADSON, OF MADISON, WISCONSIN, ASSIGNOR, BY MESNE ASSIGNMENTS, TO LANDIS TOOL COMPANY, OF WAYNESBORO, PENNSYLVANIA, A CORPORATION OF PENNSYLVANIA.

MULTIPLE-USE MACHINE.

1,121,714.      Specification of Letters Patent.      Patented Dec. 22, 1914.

Application filed November 18, 1908, Serial No. 463,320. Renewed January 10, 1912. Serial No. 670,515.

*To all whom it may concern:*

Be it known that I, CONRAD M. CONRADSON, a citizen of the United States, residing at Madison, in the county of Dane and State of Wisconsin, have invented a new and useful Multiple-Use Machine.

My invention relates to metal working machines, and more particularly to a multiple purpose machine adapted to perform a great part of the work ordinarily found in a machine shop.

A prime object of the invention is to provide in a single machine, mechanism adapting it for boring, milling, drilling, tapping, splining, oil grooving, or rotary planing any work, whether large or small and of whatever shape, the machine being adapted to perform any of these operations at will by easily and quickly made changes in driving connections, and without any disassemblage of parts or additional attachments whatever to the operative parts.

The machine is so organized that when the driving connections requisite for performing any one of the multiple operations are brought into action, the machine is adapted to be manipulated and controlled for the particular purpose or use desired, quite as conveniently and effectively as a single purpose machine for similar work. To this end, I provide a tool carrying spindle or bar with a mounting, and driving connections adapting it to be rotated and fed endwise at any one of a desired range of speeds, and with the endwise feed at a variable selected ratio to the speed of rotation, as required for boring, drilling, etc., it being possible to precisely vary the endwise feed relative to the speed of turning of the spindle through a wide range, so that the tool can be made to follow any desired path; or the tool spindle may be rotated without endwise feed as required for milling or rotary planing operations, there being for such operations provision for a lateral power feed of the tool spindle either vertically or horizontally at a rate variable as required; or the tool spindle or bar may be fed endwise without rotating as required for key slotting, splining, etc., the arrangement permitting the endwise spindle feed to be combined with a small amount of turning movement to produce spiral grooves for oil passages or the like, it being in fact, possible to produce spiral cuts of any required pitch by utilizing the change gear connections.

In the particular machine to be described, the invention is shown as embodied in an apparatus of the horizontal boring machine type for illustrative purposes, but it is to be understood that the invention in its broader aspect is not limited to this particular type of machine, nor to the details of construction thereof.

Another important feature of the invention has to do with mechanism arranged so that a quick and positive power movement to the various operative parts including the tool spindle is imparted by a separate train of gearing which does not operate through the feed change gears but independently and as it were, in a "shunt" relation thereto. This separate driving train is not only valuble and important for effecting a quick traverse of the tool in any direction desired without depending on or disturbing the connections and adjustments for the gearing which imparts operative movement to the tool, but it is also useful in effecting certain tool movements such as an endwise operation of the tool bar without rotation thereof which could not be carried out were the drive for effecting this movement a part of the same train which rotates the tool bar, the several operating mechanisms however including the rapid traverse having driving connections in common, with the single high speed vertical prime driving shaft, with provision for individual disconnection.

A further feature of the invention consists in a construction wherein the controlling devices for effecting all the various operating movements and adjustments of the tool are carried by the saddle in which the tool spindle has bearings, the speed changing and controlling devices being movable with the tool spindle in its vertical and horizontal lateral adjustments. This effects a compact organization of the mechanism and all the various hand operated controlling devices are so located as to be within convenient reach of an operator from one position, without requiring him to move about the machine, in running the same.

A still further feature of the invention consists in an improved form of mechanism for effecting the endwise feed of the tool spindle in conjunction with the rotary drive thereof, this mechanism including speed connections with a differential device for controlling a nut which engages a spiral groove in the tool spindle to effect endwise movement thereof when the nut is rotated relative to the spindle. This mechanism is specially designed to permit the tool spindle to be rotated without endwise movement or moved endwise without rotation, or rotated with any desired accompaniment of endwise feed as required for the particular work in hand, and the change from any one adjustment to any other is instantly effected by simply shifting a handle to bring the proper gear connections into action. This spindle controlling mechanism has provision for adjustment, either by hand or power, and the same elements which serve as a power feed of the spindle endwise for boring and slotting are also adapted to be used in adjusting the tool to proper position for milling or rotary planing.

A further valuable and important feature of my improved construction is that whereby the tool spindle is driven through a change gear system, enabling a wide range of speeds to be imparted thereto, so that the spindle can be rotatably driven with a relatively slow powerful movement as required for boring, rotary planing, and the like, or speeded up to a high rate as is usual for milling.

It will thus be understood that all of the features mentioned coöperate to produce a machine adapted to a wide variety of uses and which, when installed in a shop, combines in itself the functions of a large number of ordinary or single purpose machines, so that the relatively large expense and extensive floor room required for the installation of a line of such single purpose machines is avoided.

The above and other features of the invention will be better understood from the following detailed description, taken in connection with the accompanying drawings, and will be thereafter pointed out in the appended claims.

Figure 2:
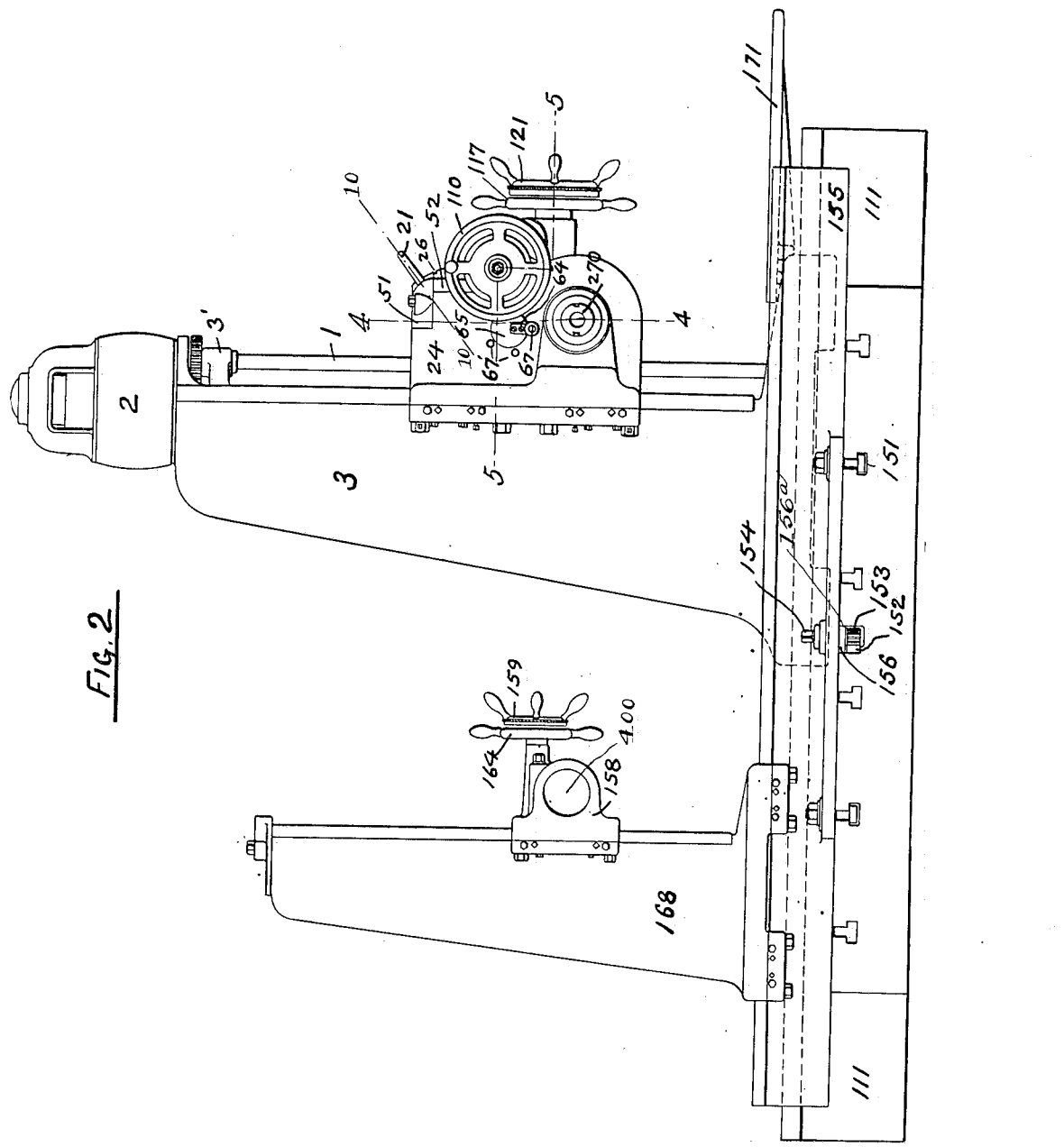
Figure 3:
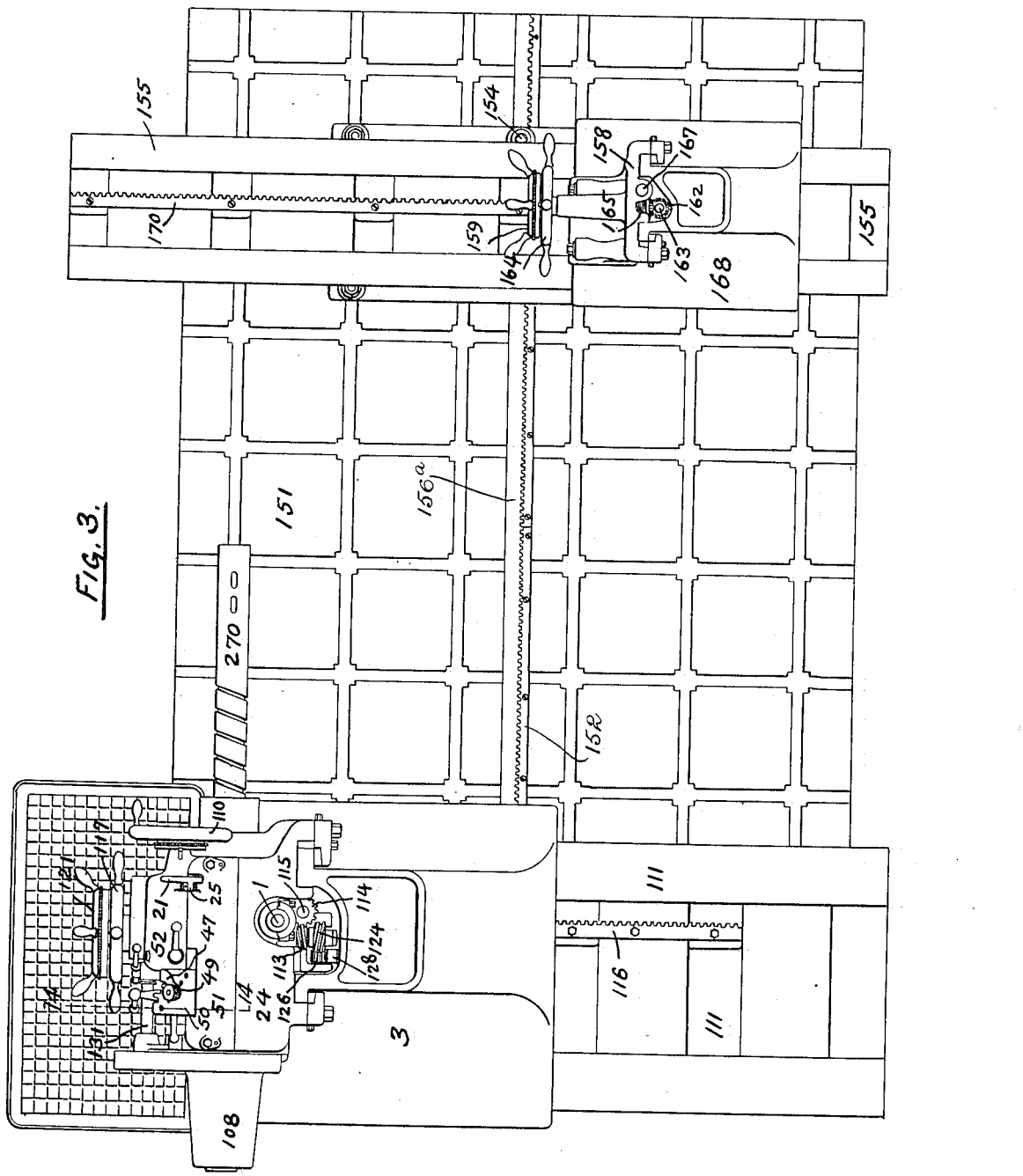
Figure 4:
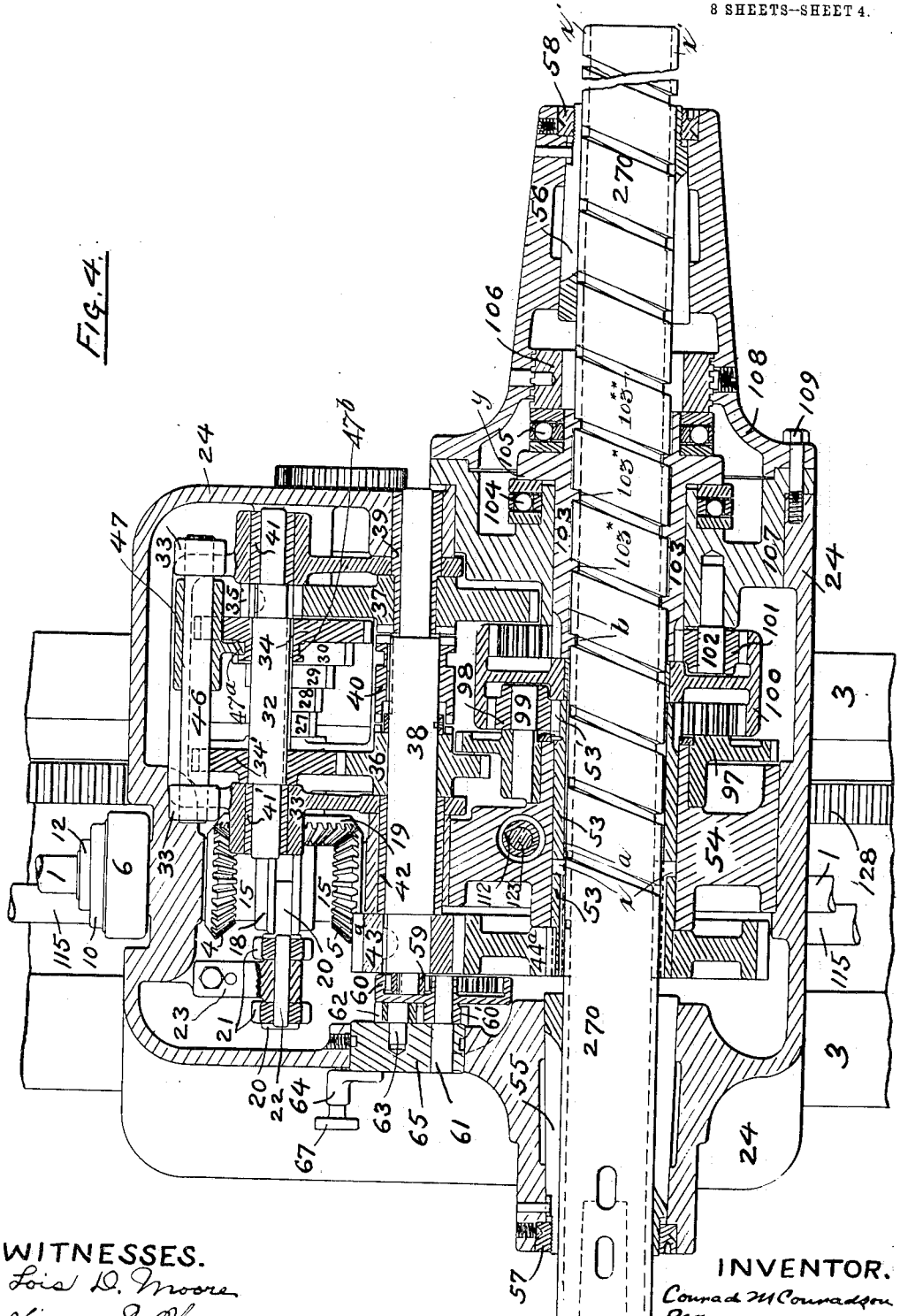
Figure 5:
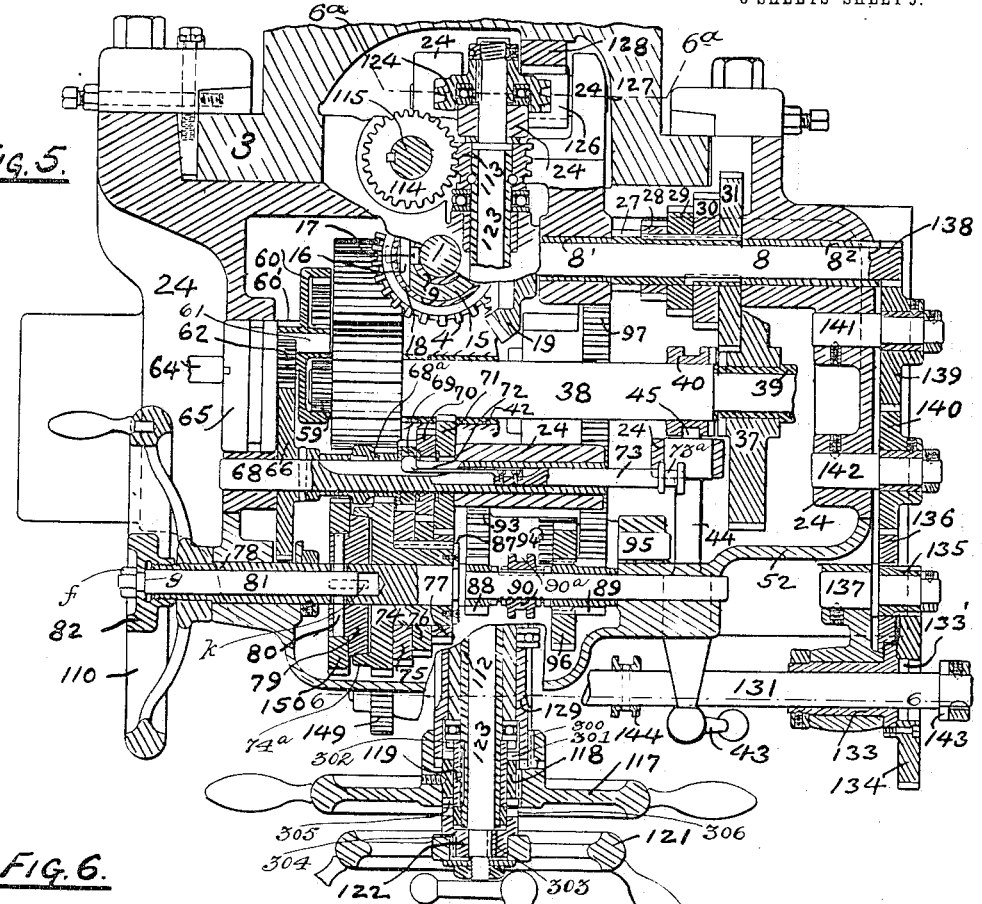
Figure 6:
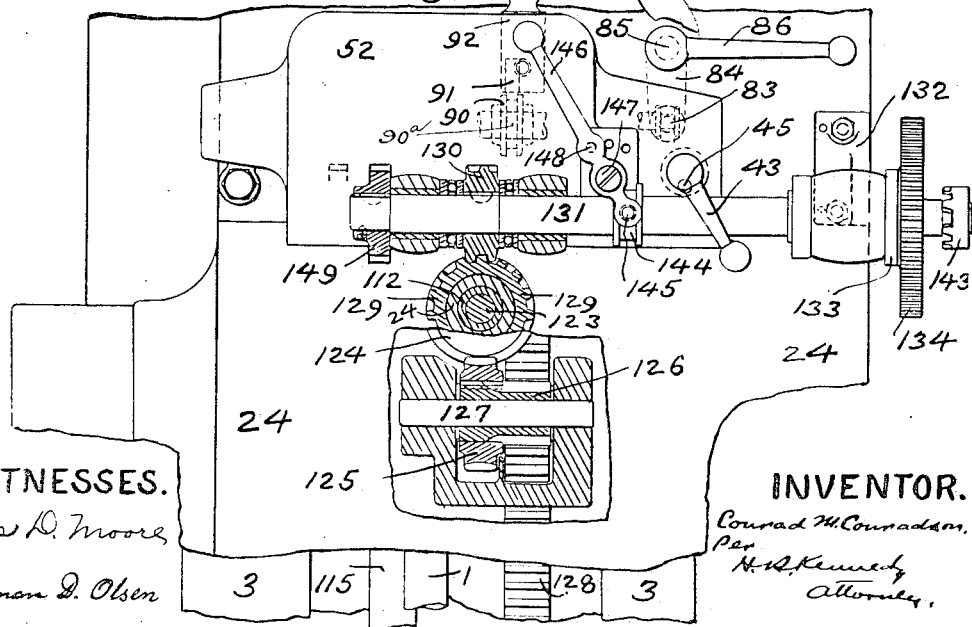

Referring to the drawings, Figure 1 is a front view showing a horizontal tool spindle or boring bar mounted in a saddle slidably mounted on a vertical column which is slidably mounted on the horizontal bed of the machine. This view also shows a slidably mounted tail support and a motor mounted at the top of the vertical column for the saddle that carries the spindle. Fig. 2 is a side view of what is shown in Fig. 1. Fig. 3 is a top-plan view of what is shown in Figs. 1 and 2, but with the motor and its supporting cap removed. Fig. 4 is a vertical, sectional view of the saddle and illustrates mechanism taken on line 4—4 of Fig. 2, and partially shows the reversing bevel gears of the driving clutch mechanism; the speed-changing mechanism and the spindle-feeding mechanism. Fig. 5 is a horizontal, sectional view of the saddle, and illustrates mechanism taken on a line 5—5 of Fig. 2. Fig. 6 is a broken front view of the saddle, partly in section at line 6—6 and partly in section at line 6ª—6ª of Fig. 5, and partially showing the column traverse mechanism. Fig. 7 is a sectional view, at line 7—7 of Fig. 1, showing details of concentric hand-wheels and mechanism for adjustments of the tail support. Fig. 8 is a 90° vertical section, at line 8—8 of Fig. 13 or line 8—8 of Fig. 9, of the vertical driving shaft mounted in the column and of a bevel gear and clutch mechanism relating to the speed gear shaft. Fig. 9 is a 90° transverse section, at line 9—9 of Fig. 8. Fig. 10 is a top view of the starting lever, partly in section at a line corresponding to line 10—10 of Fig. 2. Fig. 10ª is a side view of the starting lever, showing the same in neutral position in full lines, and indicating driving and reverse-driving positions thereof in dotted lines. Fig. 11 is an end view of the spindle feed drive, diagrammatically illustrated. Fig. 12 is an illustration of the spindle feed drive developed on the line 12—12 of Fig. 11, the development being in section on line 12—12. Fig. 13 is a front elevation of the spindle drive mechanism, partly in section on a part of line 4—4 of Fig. 14 or of Fig. 2. Fig. 14 is an end view of the spindle drive mechanism, partly in section through the stop and index plate for the spindle feed change mechanism at line 14—14 of Fig. 3.

As the drawings are somewhat complex, owing to the location in accordance with this invention of a considerable number of reversible mechanisms mostly having several functions each within the small compass of the tool-spindle carrying saddle, it will be useful to state briefly and preliminarily that the machine comprises (independently of the outboard bearing) the following main adjustments by means of appropriate groups of mechanical devices requisite for the adjustments, to wit:—1. Traverse of the saddle column from and toward the operator by manual operation of a hand-wheel,—as shown, by an inner hand-wheel. 2. Rapidly locating (approximately) the saddle column in its traverse from and toward the operator, by power applied to the inner hand-wheel sleeve and taken from a constant speed driving shaft. 3. Progressively moving the saddle column by power from and toward the operator for milling. 4. Adjustment of the saddle on its column by manual operation of a hand-wheel; as shown, by an outer hand-wheel. 5. Rapidly locating (approximately) the position of the saddle on its column by power applied to the outer hand-wheel shaft and derived from a constant speed driving shaft. 6. Progressively moving the saddle on its column by power for milling. 7. Longitudinal adjustment of the tool-spindle by manual adjustment of a hand-wheel. 8. Rapidly adjusting (approximately) the tool-spindle lengthwise by power applied to the shaft of its hand-wheel. 9. Progressively moving the tool-spindle for boring or drilling.

The outer and inner hand-wheels for the column and saddle respectively, are made concentric. The concentric arrangement makes it feasible to use hand-wheels of a large diameter, and therefore of correspondingly increased leverage, with great convenience and ease by the operator.

Although it is obviously important in large-sized machines of this type that all of the operating parts that are to be actuated at the will of the operator shall be within his reach without the necessity of walking about the machine, yet heretofore many machines of this type have been so constructed as to require an undue amount of walking about them by the operator in order to bring their requisite movements into play; and it is one of the objects of this invention to bring all those parts which the operator is required to manipulate practically into his reach from one standing-place, in practice from a relatively small-sized foot-plate shown in the drawings. In this connection it is noted that the starting lever 21; the spindle-feed hand-wheel 110; the clamping nut 82 for the power feed; the feed-reversing block 65; the adjusting-nut 57 for the spindle bearing; the column-traversing hand-wheel 117; the saddle-traversing hand-wheel 121; the traverse lever 146 for the milling-feed; the speed back gear lever 43; the feed-change lever 86; the feed back gear lever 92; and the speed-change pin 49, are all accessibly arranged, close together, and project from the spindle-carrying saddle at the front of the machine, above its foot-plate.

In the drawings, driving shaft 1 (Fig. 1) is rotated by any well known means, such, for example, as motor 2, and is journaled in the bearings $3^1$ and $3^2$ on the column 3. Shaft 1 passes through clutch bevel gears 4 and 5 (Fig. 8), and cone friction clutches 6 and 7 are respectively mounted on the bevel gears 4 and 5, and are adapted to start, stop or reverse the speed gear shaft 8. Driving shaft 1 is splined to, and passes through, sleeve 9 on which the clutch bevel gears 4 and 5 are mounted, the sleeve passing freely through the gears and rotating with driving shaft 1. Splined respectively on the upper and lower end portions of sleeve 9 are two friction cones 10 and 11 adapted to engage clutches 6 and 7, which are respectively longitudinally adjustable by means of nuts 12 and 13 threaded on sleeve 9. These form driving clutch-adjusting collars. The spline 14 connecting shaft 1 and sleeve 9 also acts as a spline for collar 15, which is fitted on sleeve 9 so as to allow the latter free longitudinal movement. Mounted on this collar 15, on pivots 16 (Fig. 9) are two fingers 17, one diametrically opposite the other and each having rounded ends 17' (Fig. 8) engaging collar 18. These fingers also engage sleeve 9 by means of the projection $17^2$ (Fig. 8). As the clutches are shown in Fig. 8, neither of them is in operative contact with the cones 10 and 11. Hence, although driving shaft 1 may be rotating, the speed gear shaft 8 is stationary; but if collar 18 is forced longitudinally in one direction or the other, it will ride over the corresponding rounded ends 17' and cause the projection $17^2$ to move the slide 9. If nut 12 has been properly adjusted, cone 10 will be forced into operating contact with clutch 6, causing bevel gear 4 to turn, and hence turn bevel gear 19 which is keyed to speed gear shaft 8. If collar 18 is forced in the other direction, then clutch 7 will be forced into action and gear 19 caused to revolve in a direction opposite to that caused by clutch 6.

Collar 18 is moved by means of a yoke 20 (Figs. 10 and 11) which is journaled in the starting lever 21, which is fulcrumed on pin 22 in the bracket 23 fastened to the saddle 24. Lever 21 extends outside of the saddle a sufficient distance to be accessible to the operator and to admit of easy operation (see Fig. 2). Located on this lever is a detent 25 (Fig. 10) adapted to engage any one of three notches 26 (Fig. 11) and thus hold the lever 21 in any one of three positions, so that the speed gear shaft 8 will have either a direct motion, or a reverse motion, or no motion.

The machine comprises a mechanism for giving the tool-carrying spindle or boring bar 270 a plurality of rotative speeds, any one of which is readily obtainable at the will of the operator. This spindle is journaled in, and thus carried by, the saddle, which is shown as a post movable up and down on a column; but the saddle may be a stationary post in some embodiments of my invention, which is not limited to the use either of a movable saddle or to a column of any kind.

The speed gear shaft 8 (Fig. 5) is journaled in bushings 8' and $8^2$ in the saddle 24, and has keyed to its pinion 27 having the function of a speed-change gear. Keyed to this pinion 27 are four other speed-change gears, 28, 29, 30 and 31, which revolve at a constant speed with speed gear shaft 8, the speed of which is constant.

Splined to the working frame shaft 32, journaled in bushings 41 and 41' (Figs. 4 and 14), on the manually operated rocking frame 33, is a sliding gear 34 which is adapted to engage any one of the speed-change gears 27, 28, 29, 30 and 31, one at a time, and thus secure for tumbler shaft 32 any one of five rotative speeds.

Shaft 32 has keyed to it a gear 34' and a pinion 35 which, respectively mesh with clutch gears 36 and 37, that are adapted to rotate freely on the back gear shaft 38 and bushing 39 respectively; but either one of the gears 36 and 37 may be positively clutched to the back gear shaft 38 by the clutch 40, which is splined to the back gear shaft 38 and has teeth adapted to engage corresponding teeth on either of the gears 36 and 37. These latter gears each have five different speeds through their connection with the speed-change gears 27, 28, 29, 30 and 31; and consequently the back gear shaft 38 can, at the will of the operator, be given any one of ten rotative speeds. Back gear shaft 38 is journaled in bushings 39 and 42 in saddle 24; and these bushings form a fulcrum for the rocking frame 33.

When the lever 21 is in the position shown by full lines in Fig. 10ª, the friction cones 10 and 11 are both disengaged from the clutch members 6 and 7, and consequently the speed gear shaft 8 is stationary. To obtain any desired one of said speeds, in one rotative direction or the other of shaft 8, the starting lever 21 is first thrown into one of the two positions shown by dotted lines in Fig. 10ª, thus engaging either clutch 6 with friction cone 10, or engaging clutch 7 with friction cone 11.

The speed-change gears 27, 28, 29, 30 and 31, and the sliding gear 34 driven from one of them, will be stopped or at least revolved only by their own inertia, by shifting the lever 21 to its middle neutral position shown in Fig. 10ª. The tooth clutch 40 (Figs. 4 and 13) is next thrown into engagement with one of the clutch gears 36 or 37 by operating the speed back gear lever 43 (Fig. 6). This oscillates the shaft 44, which is supported in a bearing in the saddle 24 (Fig. 5) and has in one end a pin 45 adapted to work in groove 45ª to give longitudinal motion to the clutch 40 in either direction, depending upon which direction the lever 43 is moved. Next, the sliding gear 34 is thrown into mesh with the proper speed-change gears 27, 28, 29, 30 or 31, as follows: Fastened in the rocking frame 33 is a fixed shaft 46 (Fig. 4) forming part of frame 33 and upon which slides a tumbler 47 which is formed with an arm 47ª that engages an annular groove 47ᵇ in the sliding gear 34. Tumbler 47 has an arm 47' (Figs. 1 and 14) provided with a knurled speed-change pin 49 which is adapted to engage any one of five holes 203 in the stop and index-plate 50, the latter being fastened to the saddle cover 51. The pin 49 is withdrawn from a hole in the plate 50, and then the tumbler 47 and hence the rocking frame 33 are swung so as to throw the sliding gear 34 out of mesh with, for instance, the gear 27 (Figs. 13 and 14). The tumbler 47 may be moved so as to slide the gear 34 in line with any one of the gears 28, 29, 30 or 31; after which the frame 33 is swung, throwing gear 34 into mesh with a predetermined change gear, and the knurled pin 49 is made to enter one of said holes in the plate 50, thereby locking the frame 33 and the sliding gear 34 in desired position.

To accomplish the just described operation of changing the speed of the back gear shaft 38 and hence of the tool-spindle 270, the operator is supposed to take the lever 21 in one hand and the knurled pin 49 in the other.

Plate 50 is conveniently formed with marginal notches 200 that are adapted to receive the guide pin 201 when the arm 47' is shifted, the guide pin when in a notch 200 bringing the reduced end 202 of the speed-change pin 49 into position to enter a hole 203.

Keyed to back gear shaft 38 is a pinion 43ª which meshes with a gear 44ª, the latter being keyed to a spindle-driving sleeve 53 journaled in a cylindrical block 54 fastened in the saddle. The sleeve is splined to spindle 270, preferably by two diametrically opposite splines $x$, so that the thrust of the gear 44ª is all taken by the frame piece 54, in which the sleeve is journaled. Spindle 270 is journaled in saddle 24 by the well known split conical bearings 55 and 56, which can be adjusted by the spindle-bearing adjusting nuts 57 and 58 respectively. Splines $x$ are loose in the opposite lengthwise extending spline grooves $x'$, so that the spindle is endwise movable through the spindle-driving sleeve when the sleeve and the spindle are rotated.

I will now describe the spindle-feeding mechanism (see Figs. 11 and 12). Concentric with and keyed to one end of the back gear shaft 38 (Fig. 4) is a pinion 59 which meshes with an internal gear 60 rotatively mounted on a stud 61 fastened in the oscillatable, feed reversing block 65. A pinion 60' which is a part of the internal gear 60 meshes with a pinion 62, adapted to rotate on the stud 63 which is fastened in block 65. Fastened to this block is a bracket 64 in which is a lock pin 67. Block 65 has an annular groove which is engaged by the point of a screw to hold the said block longitudinally. The two pinions 60' and 62 are adapted (independently or one at a time, depending on the direction of the desired feed) to engage the spur gear 66 (Fig. 5). The pinion 60' gives a forward feed; and the intermediate pinion 62 gives a reversed feed. By properly oscillating block 65, either of these two feeds may be obtained. Block 65 is locked in the respective position by the manually operable lock-pin 67, which is adapted to enter any one of three holes 67' (Fig. 2) in the saddle 24, respectively, giving direct, reverse, or no feed.

The gear 66 (Fig 5) is fastened to a shaft 68 journaled in the saddle 24. Loosely mounted on this shaft are four change-speed gears, 68ª, 69, 70 and 71, respectively adapted to be keyed to the said shaft by the spring pull spline 72. This spline is fastened to a rod 73 adapted to move longitudinally in a concentric hole in the shaft 68. The said four change-speed gears respectively engage a cone of gears 74, 75, 76 and 77, forming a solid cone of gears loosely mounted on the spindle-feed shaft 78. The gear 74 has a female clutch member 74ª to engage a cone clutch 79 which, by means of a pin 80, is fastened to the rod 81 freely mounted in a concentric hole in the spindle-feed shaft 78. Threaded to shaft 78 is an accessible knurled nut 82 engaging a nut $f$ and a shoulder $g$ on the rod 81, and adapted by turning it to give longitudinal movement in either direction to rod 81, and hence to make or break operating contact of the cone 79 with the clutch gear 74. In other words, nut 82 is the clamping nut for the power feed.

The rod 73 and hence the spring pull spline 72 are given longitudinal motion as follows: On the end of the rod 73 is an annular groove 73ª (Figs. 5 and 12) which is engaged by a pin 83 (Fig. 6) in an arm 84 which is fastened to a shaft 85 journaled in the saddle cover 52 and on one end of which is an accessible feed-change lever 86 which, by proper movement, will throw the spring pull spline into driving contact with a predetermined gear. And if the knurl 82 is turned to force the cone 79 into driving contact with the gear 74, then the spindle-feed shaft 78 will be positively rotated. The thrust of the cone 79 is taken by the split washer 87 (Figs. 5 and 12), which engages an annular groove 78ª in the shaft 78 (Fig. 12). Fastened to the spindle-feed shaft 78 is a spindle-feed hand-wheel 110.

Loosely mounted on spindle-feed shaft 78 (Figs. 5 and 12) are two toothed clutch gears 88 and 89 adapted to be independently engaged by the toothed clutch 90, which is splined to the shaft 78 and given the longitudinal motion in either direction by the pin 91 (Fig. 6) which engages an annular groove 90ª in the said clutch and is eccentrically fastened in the feed back gear lever 92, the proper movement of which effects engagement or disengagement of the clutch.

The clutch gear 88 (Figs. 5 and 12) meshes with the gear 93, which has a pinion 94 and is rotatively mounted on a stud 95 rotating in the saddle 24. The pinion 94 meshes with the gear 96 keyed to the clutch gear 89. Thus the gear 93 and pinion 94 form what is commonly called a back gear, between the clutch gears 88 and 89. Hence the spindle-feed shaft 78 has four direct feeds and four back gear feeds. The clutch gear 89 meshes with the gear 97 (Fig. 12), through the idler gear 95ª fast on stud 95. Clutch gear 88 is formed with teeth 310 that are engageable by teeth 311 of the clutch 90; and clutch gear 89 has teeth 312 that are engageable by the teeth 313 of the clutch 90. When clutch 90 and gear 88 are clutched, the spindle-feed nut 103 is rotated slowly through gear 88; gears 93 and 94; gear 96; gear 89; gears 95ª; 97; 98; 100, and 101. When clutch 90 and clutch gear 89 are clutched, the spindle-feed nut is rotated more rapidly through gears 89; 95ª; 97; 99; 100; and 101.

The operation of the spindle-feed mechanism is as follows: Assuming the gear 97 stationary, and spindle 270 rotating, and hence gear 53' on sleeve 53 rotating; then the pinions 98 (of which there are three in this construction, equally spaced, mounted on the studs 99 fastened in the gear 97,) will act as intermediate pinions between the gear 53' and the double internal gear 100 which actuates the spindle-feed nut 103 having an internal thread 103* which engages the spiral groove of the spindle. Similarly, any of three equally spaced pinions 101 on the fixed studs 102 act as intermediates between the double internal gear 100 and the gear on the feed nut 103. Hence, when spindle 270 makes one revolution, its feed nut 103 will make one revolution in the same direction; but if the gear 97 be turned in either direction, by the feed mechanism, the spindle-feed nut 103 will revolve faster or slower than the spindle 270, and hence said spindle 270 will move longitudinally in the predetermined direction, as the nut 103 is threaded to the bar 270. Hence by turning the spindle-feed hand wheel 110 the spindle can be moved longitudinally. The thrust of the spindle-feed nut 103 is taken up by the ball bearings 104 and 105, which are kept in proper adjustment by the nut 106. Nut 103 is journaled in a cylindrical block 107 which, together with a bonnet 108, is fastened to the saddle 24 by screws 109. The removal of the bonnet 108 and blocks 107 and 54, together with the saddle covers 51 and 52, allows easy access to or disassembling of the saddle mechanism. The saddle is gibbed to the column 3 (Fig. 5) and adapted to slide vertically thereon, and the column is gibbed to the bed 111 (Fig. 1) and adapted to slide horizontally thereon. The column-traversing hand-wheel and column traversing mechanism and the saddle-traversing hand-wheel and saddle-traversing mechanism will now be described. The milling feed is obtainable by traversing the column by power. Journaled in the saddle is a hollow horizontal shaft 112 (Fig. 5) upon the rear end of which is a worm gear 113 meshing with a worm gear 114 which is splined to the vertical, column traverse shaft 115. This shaft is supported by suitable bearing in the column 3 (Fig. 1) and has on its lower end a pinion 120 meshing with rack 116, which is fixed and extends from the front to the rear of the column-supporting bed 111.

The column-traversing hand-wheel 117 (Fig. 5) has keyed to it a double toothed clutch 118 which is adapted to move longitudinally with the said hand-wheel. On the hollow shaft 112 is keyed a toothed sleeve 119, so that when the column-traversing hand-wheel is moved inwardly, the teeth 301 on clutch 118 will engage the teeth 302 on sleeve 119. Hence, if the column-traversing hand-wheel 117 is turned while thus clutched, the column-traversing shaft 115 (Fig. 1) will be rotated, and the pinion 120, engaging rack 116, will traverse column 3 on the bed 111, either rearwardly or forwardly, depending on the direction in which the wheel 117 is turned. The foregoing relates to manual traverse of the column. In such manual traverse, the traverse lever 146 must be in its neutral position.

The saddle is given vertical motion by turning the saddle-traversing hand-wheel 121 which is keyed at 304 to a clutch 122 which is keyed at 303 to a shaft 123 passing through, and journaled at its forward position in, the hollow shaft 112, and at the other end journaled in saddle 24. This shaft 123 has keyed to it a worm 124 (Fig. 5) which meshes with a worm gear 125 (Fig. 6) which has keyed to it a rack pinion 126, both journaled on a stud 127. Pinion 126 meshes with a rack 128 fastened to column 3. Hence, by turning the saddle-traversing hand-wheel 121, saddle 24 can be moved up or down on the column 3 (Fig. 1), as desired. The angle of the teeth of the worm 124 and gear 125 is made so that the weight of the saddle will not cause the shaft 123 to turn. The foregoing relates to the manual, vertical traverse of the saddle.

To obtain power traverse of the saddle, the column-traverse hand-wheel 117 is moved forwardly, causing its clutch teeth 305 to engage the clutch teeth 306 on the saddle-traversing hand-wheel 121. Then rotation of gear 74 in mesh with gear 149 will rotate shaft 131 and spiral gear 130 which meshes with the spiral gear 129. Gear 130 is splined to shaft 131, and the latter is journaled in bearings in the saddle cover 52 and bracket 132. In this bracket is journaled a sleeve 133 having clutch teeth 133'. Fastened to this sleeve is a gear 134 meshing with a pinion 135 fastened to a gear 136 and adapted to rotate on the stud 137.

On speed gear shaft 8 is a pinion 138 which is connected to the gear 136 through the intermediate idler gears 139 and 140 respectively mounted on studs 141 and 142. Fastened to the shaft 131 is a toothed clutch 143 adapted to mesh with the toothed clutch 133'. On the rapid traverse shaft 131 is fastened a collar 144 having an annular groove engaged by a trunnion 145 pivoted in the manually operable lever traverse 146. This lever is fulcrumed on the screw stud 147; a detent pin 148 is adapted to hold the lever 146, and hence the rapid traverse shaft 131, in any one of three positions. When in the position shown in Fig. 5, the clutch 143 is disengaged from the clutch 133' and the gear 149 is in mesh with the gear 74 (Fig. 5), and hence the rapid traverse shaft 131 may have any one of four speeds obtainable from the change-feed gears 68ª, 69, 70 or 71. And hence the column or saddle may respectively have any of these feeds, and in either direction, by using the reverse obtained by the gears mounted on the block 65, as has already been explained.

When the traverse lever 146 is in the extreme right hand position, the clutch 143 is in engagement with clutch 133' and the gear 149 is in mesh with gear 150. Hence the spindle-feed shaft 78 and the spindle 270, as well as the column and saddle feeds, are now indirectly driven from pinion 138 on shaft 8, and at a rapid speed so as to allow rapid traverse of the column and saddle. This drive is from pinion 138 through idler gear 139 on stud 141; idler gear 140 on stud 142; and idler gear 136 on stud 137, which carries a gear 135 that meshes with gear 134. Gears 139, 140 and 136 mesh one with another, and are respectively loose on their studs 141, 142 and 137. These studs are fixed in the saddle. When clutch 143 fast on shaft 131 is interlocked with clutch teeth 133' of sleeve 133 to which gear 134 is fast, shaft 131 is rotated, gear 149 being then in position, as indicated by dotted lines in Fig. 6, to engage gear 150 (Fig. 5) which is fast on spindle feed shaft 78. As already set forth, certain devices operatively connect the spindle feed shaft 78 with spindle 270, and hence the latter may be rotated, indirectly, from the pinion 138 on shaft 8, as stated.

When the traverse lever 146 is in its vertical or central position, clutch 143 is out of engagement with clutch 133', and pinion 149 is out of mesh with gears 74 and 150. Hence the column-traversing and saddle-traversing hand-wheels 117 and 121 can be turned by hand; and if properly clutched as hereinbefore explained, they will move the column or saddle respectively.

The rapid traverse of the spindle or column or saddle, in either direction, is obtained by utilizing clutches 6 and 7 shown in Fig. 8, the rapid traverse being obtained from shaft 8 through the idlers, as already described. But to obtain the rapid traverse of the spindle, the gear 149 has to engage gear 150, and consequently gear 150 and cone clutch 79 are keyed together by key $d$ (Fig. 12), and clutch 79 and spindle-feed shaft 78 are keyed together at $k$ (Figs. 5 and 12), so that rotation of gear 150 effects a traverse of the spindle whenever clutch 90 is in engagement with either gear 88 or 96.

When the traverse lever 146 is thrown into its left-hand position, gear 149 will be in mesh with gear 74, and clutches 143 and 133 will be disengaged. Then rotation of gear 74 will rotate gear 149 and shaft 131 on which the spiral gear 130 is keyed, thus driving spiral gear 129 which is splined to the column-traversing hand-wheel 117 by spline 300. By pushing hand-wheel 117 rearwardly, the clutches 301 and 302 will be engaged and the power traverse of the column for milling operation obtained. The mill power traverse of the saddle is obtained by pulling the hand-wheel 117 forward to engage clutches 305 and 306.

All the manually controlled levers and hand-wheels for the saddle-contained mechanisms are located on the saddle, so that the operator may devote the maximum amount of time and attention to the work being done by the machine and not lose time by walking about it. The spirally grooved tool-spindle construction permits the use of a tool-spindle of great length. The construction also does not cause a thrust or unbalanced strain on the spindle, as both the sleeve 53 and nut 103 and its thread 103* are of an interior diameter slightly larger than the diameters of the spindle and the thread thereon. The spindle has a similar clearance in the spindle-driving sleeve 53, so that the spindle rests only in its end bearings 55 and 56, and the nut 103 is in contact with the spindle only when the sides of its thread 103* contact with the side walls of the spiral groove 103** of the spindle. The clearance in sleeve 53 is marked $a$; in nut 103 it is marked $b$.

Machines recently built show the feeding mechanism to be very sensitive, the cutting of a $\frac{1}{8}$ inch drill being felt at the hand-wheel 110, the bar 270 being $3\frac{1}{2}$ inches in diameter. The spirally threaded tool-carrying spindle is lengthwise actuated from the cone gears 68$^a$, 69, 70 and 71, that are successively thrown into operation by a lengthwise movement of the slidable key 72 whereby these four cone gears are severally fixed, at the will of the operator, to their shaft. The cone gear 68$^a$ meshes with cone gear 74; the cone gear 69 with the cone gear 75; the cone gear 70 with the cone gear 76, and the cone gear 71 with the cone gear 77; and the movement of each of these two intermeshing pairs of cone gears is ultimately communicated to the spirally grooved spindle through the intermediate nut 103 and other parts already described.

It is to be noted that the spindle, although rotating, will not move endwise unless the clutch member 74$^a$ that is a part of the cone gear 74 is clutched to the feed shaft 78 by engagement with the clutch member 79 slidably mounted on shaft 78. When the clutch members 74$^a$ and 79 are out of engagement, the spindle is rotated without endwise movement or feed. When such clutch members are in engagement, the spindle is rotated and also fed endwise.

The location of the motor at the top of the column 3 and its connection at that point with the shaft 1 which transmits power to the gearing inclosed in the saddle is very convenient and efficient, and eliminates the use of many otherwise necessary gears and shafts. The machine can be started, stopped and reversed independently of the motor by actuation of the starting lever 21. As before stated, the column can be traversed by hand or by power in either direction, and the machine can be readily used for milling. The outboard bearing has vertical and horizontal traverses the same as the main column, and is adapted for supporting long boring bars, as will be readily understood by all skilled in the art; but the arrangement of the outboard bearing is such that it may be kept at all times parallel with the main column 3, the saddle of which, as already indicated, can be moved in either direction for vertical milling, the saddle being adjustable either by power or by hand.

A striking advantage of the present invention is that the full traverse of the spindle is obtained without re-setting, regardless of its length, the feeding mechanism of the spindle being controlled by means of the rotary spindle-feeding nut and connected mechanism, permitting any length of feed of the spindle without re-clamping it, and making the feed positive and more uniform than the ordinary gear feed. This described arrangement of the spindle-feed is very sensitive, in consequence of the fact that the spindle, spindle-feed nut and related mechanisms rotate together, thereby minimizing friction. The spindle-feed nut 103 is provided with a heavy annular flange $y$ which runs between the ball thrust bearings 104 and 105 the bearings taking the end thrust of the spindle in either direction and transferring the thrust direct to the saddle.

It is to be understood that where I use the expression "rapid traverse movement" or the like in the present description and claims, I mean the relatively high speed movements for bringing the tool on the tool spindle to operative position as effected from the shaft 8 through the gears 138, 139, 140, etc., to the shaft 131 and gear 149 and thence to effect the required movement by transmission to gear 74 or 150, according as it is required to transmit rapid traverse to the column or saddle, or to the spindle. Likewise where I use the expression "operative movement" or "feed movement" I means the transmission from shaft 8 through change gears to shaft 38 and through the other reducing and change gears inside of the saddle housing; the foregoing however to be understood with certain exceptions, e. g., as to the endwise movement of the tool spindle, that movement which is its rapid traverse movement to bring a rotary tool to operative position when the machine is to be utilized for milling or drilling, is its operative movement when the machine is to be used for splining, key-seating or other reciprocating tool operations.

The tail support column or outboard bearing 168 has mounted on it a vertically movable saddle 158 which is operated by a hand-wheel 159 fastened to a shaft 157 (Fig. 7) journaled in a sleeve 160. On the other end of this shaft is keyed a bevel gear 161 meshing with a bevel gear 162 rotatably mounted in said saddle and threaded to a fixed screw 163. Hence, by turning hand-wheel 159 in the proper direction, the saddle 158 is moved up or down on column 168 (Fig. 2). The sleeve 160 has fastened to one end a hand-wheel 164, and to the other end a worm 165 which meshes with a gear 166 journaled in saddle 158 and splined to the shaft 167 (Fig. 1). This shaft is supported by bearings in column 168, and has on one end a pinion 169 (Fig. 1) meshing with a rack 170 fastened to the bed 155.

Fastened to bed 111 of column 3 is a floor-plate 151 (Fig. 3) provided with T slots and having a rack 152 adapted to mesh with a pinion 153 (Fig. 2) on stud 154 which is journaled in the bed 155. This stud is squared at its upper end for reception of a wrench in adjusting the position of bed 155 on the floor-plate 151, and bed 155 is tongued to the floor-plate 151 by a tongue 156 in a groove 156ª in which the rack 152 is fixed; so that the ways of the bed 155 are always parallel to the ways of bed 111. Thus, by operation of pinion 153, the column 168 of the outboard bearing may be moved laterally from and to the column 3 that carries the spindle-supporting saddle; and fixed parallelism of the two columns 3 and 168 is always insured, and these columns may be moved rearwardly and forwardly in parallelism, as already described, so that whenever desired, the tool-spindle may be journaled at one portion in the bore 400 of the saddle 158.

What I claim is:—

1. A multiple use machine, comprising a tool spindle, a mounting therefor arranged to permit said spindle to turn on its axis, to move lengthwise, and to be moved laterally, separate driving connections for effecting each of said movements, and means for rendering any one of said connections inoperative at will without affecting the operation of any of the other said connections.

2. A multiple use machine, comprising a tool spindle mounted for turning movement on its axis, for endwise movement, and for lateral movement, separate driving connections for effecting each of said movements, said driving connections being individually disconnectible at will, and the connection for effecting endwise movement, including a change speed device.

3. A multiple use machine, comprising a tool spindle mounted for turning movement on its axis, for endwise movement, and for lateral movement, separate driving connections for effecting each of said movements, said driving connections being individually disconnectible at will, and the connections for effecting turning movement and endwise movement of the spindle each including a change speed device, said change speed devices being adapted to coöperate to cause the turning movement of the tool to be in any desired ratio to the endwise feed thereof.

4. A multiple use machine, comprising a tool spindle, a bearing support in which said spindle is mounted for rotation and endwise movement, ways on which said bearing support is movable to shift said spindle laterally, and separate power connections for rotating said spindle and moving it endwise in its bearing support and for moving said bearing support on its ways, each of said power connections having an individual disconnectible portion.

5. A multiple use machine, comprising a base, a column rising therefrom, a saddle slidably supported on said column, a horizontal tool spindle mounted in said saddle for rotation and endwise movement, and driving connections for moving the saddle on said column, for rotating the spindle, and for moving it endwise, there being provision for disengaging said connections to any of said parts at will while retaining operative connections to the other parts selectively.

6. A multiple use machine, comprising a base, a column rising therefrom, a saddle guided on said column, a tool spindle mounted for rotation and endwise movement in said saddle, a single source of power, and separate connections from said power source for moving said saddle on said column, moving said spindle endwise in said saddle, and rotating said spindle, each of said connections being individually disengageable at will.

7. A multiple use machine, comprising a base, a column arising therefrom, a saddle guided in vertical ways on said column, a tool spindle mounted for rotation and endwise movement in said saddle, a single power source extending up through said column, and separate individually controllable connections from said power source for moving said saddle on its ways, for moving said spindle endwise, and for rotating said spindle, said connections for rotating said spindle and for moving it endwise each including a change speed device.

8. A multiple use machine, comprising a base, a column rising therefrom and laterally movable on the base, a saddle vertically guided on said column, a horizontal spindle mounted for rotation and endwise movement in said saddle, and separate power connections for moving said column on said base, for moving said saddle on said column, for rotating said spindle, and for moving it endwise, each of said connections having provision for disengagement at will.

9. A multiple use machine, comprising a base, a column rising therefrom and laterally adjustable thereon, a saddle vertically slidable on said column, a spindle mounted for rotation and endwise movement in said saddle, a single power source vertically arranged in said column and having separate connections for moving said column on the base, said saddle on the column, for rotating said spindle and moving it endwise, each of said connections having provision for disconnection at the saddle.

10. A multiple use machine, comprising a saddle mounted for vertical movement, a spindle mounted for rotation and endwise movement in said saddle, and driving connections for imparting either alone or both of said movements to said spindle at will.

11. A multiple use machine, comprising a saddle mounted for vertical movement, a spindle mounted for rotation and endwise movement in said saddle, and driving connections for imparting either alone or both of said movements to said spindle at will, said connections having provision for varying the rate of turning movement of the spindle relative to the rate of endwise movement thereof.

12. A multiple use machine comprising a tool spindle mounted for both endwise and turning movement, driving connections therefor comprising means which will permit endwise movement in both directions without turning and also means to permit turning without endwise movement at will.

13. A multiple use machine comprising a tool spindle mounted for both endwise and turning movement, driving connections therefor comprising means which will permit endwise movement in both directions without turning and also means to permit turning without endwise movement, said means having provision for effecting both turning and endwise movement in variable and determinate ratios at will.

14. A multiple use machine, comprising a tool spindle mounted in bearings for rotation and endwise movement, and driving connections therefor arranged to move said spindle in its bearings to effect movement of a given point on a tool carried by said spindle either in a circle transverse of said spindle, forward and backward at will in a straight line lengthwise of said spindle, or in any one of a series of spiral paths of definitely varied pitch between such limits.

15. A multiple use machine, comprising a tool spindle, driving connections arranged to effect rotary and endwise movement of said spindle in variable ratios, or either movement without the other, and a mounting for said spindle having provision to effect power driven lateral movement of the spindle.

16. A multiple use machine, comprising a tool spindle having driving connections for imparting rotary and endwise movement thereto in definitely varied ratios, or either movement without the other, a mounting for said spindle guided to move the spindle laterally, and a single power source having separate connections for effecting all of said movements, there being provision on said spindle mounting for disengaging each connection at will.

17. A machine of the kind described comprising a horizontal tool spindle, a saddle in which said spindle is mounted for rotary and endwise movement, an upright column on which said saddle is mounted for vertical movement, and an upright driving shaft journaled on said column, said saddle being formed as a gear box and providing a housing containing within itself complete trains of gearing for rotating the spindle at variable rates and feeding it endwise at variable rates.

18. A machine of the kind described, comprising a horizontal tool spindle, a saddle in which said spindle is mounted for rotary and endwise movement, and a column on which said saddle is vertically slidable, said saddle being formed as a gear box containing within itself driving connections for the spindle and change speed feed connections therefor, there being controlling devices for said driving and feed connections carried by the saddle and arranged to be accessible to an operator from one position.

19. A multiple use machine, comprising a tool spindle, power driving connections arranged to effect rotary and endwise movement of said spindle in variable ratios, and means for separately reversing the direction of rotary and endwise movement so that the direction of either movement may be reversed without the other.

20. A multiple use machine, comprising a tool spindle, driving connections arranged to effect rotary and endwise movement of said spindle, said connections for effecting rotary movement having provision for changes of speed and also for disconnection, and being arranged to hold the spindle against rotary movement at will while operative for endwise movement.

21. A machine of the class described, comprising a tool spindle, a support therefor with spaced apart bearings in which said spindle is mounted for rotatable and endwise movement, a drive sleeve having a separate bearing in said support and engaging said spindle to turn the same, and other means having a separate bearing in said support for moving the spindle endwise.

22. A machine of the class described, comprising a tool spindle, a support having spaced apart bearings in which said spindle is mounted for rotary and endwise movement, a driving sleeve mounted concentrically with said spindle in a separate bearing of said support in splined engagement with the spindle, and a second sleeve having separate bearing in said support in endwise moving engagement with said spindle.

23. A machine of the class described, comprising a saddle, a spindle mounted for rotation and endwise movement in spaced apart bearings thereof, said spindle having a spline groove and a spiral groove thereon, a driving sleeve and a nut sleeve mounted in separate bearings of said saddle between said spindle bearings and engaging said spindle for rotation and endwise movement thereof respectively.

24. A machine of the class described, comprising a tool spindle, power driving connections for imparting rotary and endwise movement thereto or either at will with the other disconnected, and means for imparting either movement by hand with the power drive disconnected.

25. A machine of the class described, comprising a base, a vertical column laterally movable thereon, a saddle vertically guided on said column, a tool spindle rotatable and endwise movable in said saddle, a single power drive extending up through said column, and devices carried by said saddle for effecting a controlled actuation of said column, said saddle, and said spindle from said single power drive, or an actuation of said parts selectively at will.

26. A machine of the class described, comprising a base, a vertical column laterally movable thereon, a saddle vertically guided on said column, a tool spindle rotatable and endwise movable in said saddle, and means for controlling the movement of the column on the base from the saddle.

27. A machine of the class described, comprising a base, a vertical column laterally movable thereon, a saddle vertically guided on said column, a tool spindle rotatable and endwise movable in said saddle, means for controlling the movement of the column on the base from the saddle, and means for controlling and varying the rotary and endwise movement of the spindle from the saddle, there being a single prime drive shaft extending up through said column for imparting actuation to all of said parts.

28. A machine of the class described, comprising a tool spindle, a saddle in which said spindle is mounted for rotary and endwise movement, a column on which said saddle is vertically slidable, a base on which said column is movably mounted, power driving means having a prime motive shaft extending vertically up the column for rotating said spindle, for moving it endwise and for moving said saddle on said column, said means having provision operable at the saddle from one position of an operator for disconnection to each of said parts, and means for moving each of said parts manually with the power drive disconnected.

29. A machine of the class described, comprising a tool spindle, a saddle in which said spindle is mounted for rotation and endwise movement having provision housed therein for effecting the same, ways on which said saddle is vertically slidable, power driving means for rotating said spindle and moving it endwise, adapted to also rotate it without endwise movement, and means for moving said spindle endwise manually at will.

30. A machine of the class described, comprising a tool spindle mounted for rotary and endwise movement, means for rotating said spindle and moving it endwise, formed and adapted to also rotate it without endwise movement, said means having provision for turning the spindle with a relatively slow powerful movement for boring or the like, or at a relatively high rate of speed for milling, at will, and means for moving the spindle bodily laterally by power while said rotating means is operative, at will.

31. A machine of the class described, comprising a tool spindle, and driving mechanism for imparting rotary, endwise movement thereto, said mechanism consisting in a differential device for effecting endwise movement and a change speed device adapted to impart relatively slow powerful turning movement to the spindle as required for boring and the like, or a relatively high rate of speed for milling, at will, and means for imparting power feed movement between the tool spindle and work in a direction transverse of the spindle, at will.

32. A machine of the class described, comprising a tool spindle, and mechanism for imparting rotary, endwise movement thereto, said mechanism consisting in a differential device for imparting endwise feed having a rotary nut coöperative with the spindle, and a change speed device for imparting relatively slow powerful turning movement to said spindle, or a relatively high rate of speed for the purpose stated, there being also provision for reversing the rotation of the spindle, and means for imparting power feed movement between the tool spindle and work in a direction transverse of the spindle, at will.

33. A machine of the class described, comprising a tool spindle, and mechanism for effecting rotary, endwise movement thereof, consisting in a differential device having a nut engaged with the spindle for moving it endwise and a change speed device for effecting rotary movement of the spindle at different rates for the purpose stated, there being provision for reversing the direction of endwise movement of the spindle and also for reversing its direction of turning movement, and means for imparting power feed movement between the tool spindle and work in a direction transverse of the spindle, at will.

34. A machine of the class described, comprising a tool spindle and mechanism for imparting rotary, endwise movement thereto, consisting in a nut engaged with the spindle for feeding it endwise, a planetary gear system arranged to control the movement of said nut with a member remaining stationary when the nut turns at the same rate as said spindle, means for imparting variable movement to said member, and means for rotating the spindle at a relatively low rate for boring and the like, or at a relatively high rate for milling, and means for imparting power feed movement between the tool spindle and work in a direction transverse of the spindle, at will.

35. A machine of the class described, comprising a tool spindle and mechanism for imparting rotary, endwise movement thereto, consisting in a change speed device for turning the spindle at variable rates for the purpose stated and a differential device for imparting endwise movement to the spindle, there being provision for rendering said differential device inoperative, and means for reversing the direction of movement of the spindle at will, and means for imparting power feed movement between the tool spindle and work in a direction transverse of the spindle, at will.

36. A machine of the class described, comprising a tool spindle mounted in spaced apart bearings and mechanism for imparting rotary and endwise movement thereto, consisting in a drive sleeve splined to the spindle for turning the same, and a nut sleeve engaged with the spindle for moving it endwise, each of said sleeves having bearings separate from the spindle bearings, and being fitted to said spindle with provision for clearance relative thereto.

37. A machine of the class described, comprising a tool spindle, means for rotating the same, mechanism for effecting endwise movement thereof, consisting in a planetary gear device, having an element remaining stationary to permit the spindle to be rotated without moving endwise, and having connections for hand control whereby the spindle may be moved endwise when either at rest or in motion, and means for imparting power feed movement between the tool spindle and work in a direction transverse of the spindle, at will.

38. A machine of the class described, comprising a tool spindle, means for rotating the same, mechanism for effecting endwise movement thereof, consisting in a planetary gear device, having an element remaining stationary to permit the spindle to be rotated without moving endwise, with connections to be driven by power at variable speeds, and another connection for hand control, whereby endwise movement of the spindle may be effected when it is either at rest or turning, and means for imparting power feed movement between the tool spindle and work in a direction transverse of the spindle, at will.

39. The combination of a main driving shaft; a forward clutch mechanism connected therewith; a reverse clutch mechanism connected therewith, and a starting lever for operating either of said clutches; a gear for each of said clutch mechanisms; a gear meshing with said two clutch gears, and a shaft on which said gear is fixed; a series of speed-change gears on said shaft; a speed back gear mechanism, and means under the control of the operator for connecting and disconnecting the speed change gears with the speed back gears; a driving pinion shaft; a driving pinion thereon, and means for connecting said driving pinion with the main shaft; a saddle; a spirally grooved spindle carried by the saddle; a spindle sleeve on the spindle, and means for connecting the spindle sleeve with the spindle so as to rotate therewith while allowing the spindle to move endwise in said sleeve; a driving gear fixed on said spindle sleeve and meshing with the driving pinion; a gear on said spindle sleeve; a planetary gear mechanism operatively connected with the gear on the spindle sleeve, and a spindle-feed nut on and engaging with the spindle and operatively connected with said planetary gear;

feed back gears operatively connected with the planetary gear mechanism to drive it; a feed back gear clutch and a feed-change mechanism, the feed back gear clutch being operatively mounted between the feed-change gear mechanism and the feed back gear mechanism and operable to connect or disconnect the feed back gear mechanism with the planetary gear mechanism and also operable to operatively connect the feed-change gear mechanism with the planetary gear mechanism; means for throwing the feed-change gear mechanism into or out of operating position at will; and a feed-reverse gear mechanism comprising means for throwing it at will into connection with said driving pinion.

40. The combination of a main driving shaft; a forward clutch mechanism connected therewith; a reverse clutch mechanism connected therewith, and a starting lever for operating either of said clutches; a gear for each of said clutch mechanisms; a gear meshing with said two clutch gears, and a shaft on which said gear is fixed; a series of speed-change gears on said shaft; a speed back gear mechanism, and means under the control of the operator for connecting and disconnecting the speed-change gears with the speed back gears; a driving pinion shaft; a driving pinion thereon; and means for connecting said driving pinion with the main shaft; a saddle; a spirally grooved spindle carried by the saddle; a spindle sleeve on the spindle, and means for connecting the spindle sleeve with the spindle so as to rotate therewith while allowing the spindle to move endwise in said sleeve; a driving gear fixed on said spindle sleeve and meshing with the driving pinion; a gear on said spindle sleeve; a planetary gear mechanism operatively connected with the gear on the spindle sleeve, and a spindle-feed nut on and engaging with the spindle and operatively connected with said planetary gear; feed back gears operatively connected with the planetary gear mechanism to drive it; a feed back gear clutch and a feed-change mechanism, the feed back gear clutch being operatively mounted between the feed-change gear mechanism and the feed back gear mechanism and operable to connect or disconnect the feed back gear mechanism with the planetary gear mechanism and also operable to operatively connect the feed-change gear mechanism with the planetary gear mechanism; means for throwing the feed-change gear mechanism into or out of operating position at will; a feed-reverse gear mechanism comprising means for throwing it at will into connection with said driving pinion; a milling feed mechanism comprising a rapid traverse gear; means for throwing said rapid traverse gear into and out of connection with the feed-change gear; means under the control of the operator for connecting said milling feed shaft with a rapid traverse clutch mechanism; said rapid traverse clutch mechanism operatively connected with said milling feed shaft; a series of rapid traverse gears operatively connected with a gear fixed on one of the rapid traverse clutch members; and means for operatively connecting the rapid traverse gears with the speed-change gear lever.

41. The combination of a shaft with a manually operable saddle-adjusting device mounted thereon and a clutch mechanism for connecting it with or disconnecting it from said shaft; and a manually operable column traverse device operatively connected with said shaft, and a gear inclosing the same; a clutch mechanism for connecting and disconnecting the column traverse manually operable device with said gear; a power shaft provided with a gear meshing with the gear in clutch connection with the column traverse device; a column; a base therefor, the column being adjustable on the base; an adjustable saddle on the column, and means connecting the column traverse shaft with the saddle for the adjustment of the latter on the column.

42. The combination of a base; a column slidably mounted on the base; a saddle slidably mounted on the column; a rotatable, endwise movable tool-spindle; a column traverse hand-operated device; mechanism operatively connecting the column, the column traverse hand operated device and the base, for manual, reversible traverse of the column on the base; a saddle traverse hand-operated device; mechanism operatively connecting the saddle, the saddle traverse hand-operated device and the column, for manual, reversible traverse of the saddle on the column; other mechanism under control of the operator, for securing automatic, reversible traverse of the column; other mechanism, under control of the operator, for securing automatic, reversible traverse of the saddle without use of the saddle traverse hand-operated device; a spindle feed mechanism, the speed of which is variable at the will of the operator; and means for varying the speed of said feed; all organized and cooperating as a unitary structure.

43. The combination of a base; a column slidably mounted on the base; a saddle slidably mounted on the column; a rotatable and endwise movable tool spindle; a column traverse hand-operated device; mechanism operatively connecting the column, the column traverse hand-operated device and the base, for manual reversible traverse of the column on the base; a saddle traverse hand-operated device; mechanism operatively connecting the saddle, the saddle traverse hand-operated device and the column, for manual reversible traverse of the saddle on the column; other mechanism, under control of the operator, for securing automatic, reversible traverse of the column; other mechanism, under control of the operator, for securing automatic, reversible traverse of the saddle; a spindle feed mechanism, the speed of which is variable at the will of the operator; and means for varying the speed of said feed; all organized and coöperating as a unitary structure, and the said hand-operated devices being mounted on concentric supports, and one being laterally movable in relation to the other to secure the column and saddle traverse manually.

44. The combination of a tool spindle; a spindle driving gear; means operatively connecting the driving gear with the spindle; a high-speed spindle driving mechanism; a low-speed spindle driving mechanism; means under the control of the operator for throwing either the high-speed or low-speed driving mechanism into operation as desired; means under the control of the operator for varying the speed of either the high or low-speed driving mechanism; a saddle in which said spindle and other mechanisms are mounted; a column on which said saddle is adjustably mounted; a base on which the column is slidably mounted; a mechanism for traversing the saddle on the column, and a mechanism for traversing the column on the base; and concentric hand devices for effecting said traversing movements.

45. The combination of a tool-spindle; a spindle driving gear; means operatively connecting the driving gear with the spindle; a high-speed spindle driving mechanism; a low-speed spindle driving mechanism; means under the control of the operator for throwing either the high-speed or low-speed driving mechanism into operation as desired; means under the control of the operator for varying the speed of either the high-speed or low-speed driving mechanism; a saddle in which said spindle and other mechanisms are mounted; a column on which said saddle is adjustably mounted; and a base on which the column is adjustably mounted.

46. A machine of the kind described comprising a tool bar mounted for rotation and endwise movement, means for rotating the bar having provision for disconnection, means for feeding the bar endwise at a relatively low rate to accompany the rotation thereof, and separate means for effecting variable endwise movement of the tool bar at relatively high speeds in either direction at will, the last named means being arranged and adapted for operation and control with the tool bar either in rotation or at rest.

In testimony whereof I have hereunto set my hand in the presence of two subscribing witnesses.

CONRAD M. CONRADSON.

Witnesses:
   Lois D. Moore,
   Simon D. Olsen.